(12) United States Patent
Li et al.

(10) Patent No.: US 7,662,467 B2
(45) Date of Patent: Feb. 16, 2010

(54) CARBON NANOTUBE COMPOSITE AND METHOD FOR FABRICATING THE SAME

(75) Inventors: Qing-Wei Li, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 349 days.

(21) Appl. No.: 11/550,369

(22) Filed: Oct. 17, 2006

(65) Prior Publication Data

US 2008/0039557 A1 Feb. 14, 2008

(30) Foreign Application Priority Data

Aug. 11, 2006 (CN) .................... 2006 1 0062083

(51) Int. Cl.
  *B32B 27/04* (2006.01)
  *B32B 27/20* (2006.01)
  *C08K 3/00* (2006.01)
  *C08K 3/04* (2006.01)

(52) U.S. Cl. .............. 428/298.4; 428/297.4; 428/298.1; 977/778; 977/779; 977/783; 977/785; 977/786; 977/787

(58) Field of Classification Search ........................ None
See application file for complete search history.

(56) References Cited

U.S. PATENT DOCUMENTS

| | | | |
|---|---|---|---|
| 6,856,016 B2 | 2/2005 | Searls et al. | |
| 6,921,462 B2 | 7/2005 | Montgomery et al. | |
| 6,924,335 B2 | 8/2005 | Fan et al. | |
| 6,936,653 B2 | 8/2005 | McElrath et al. | |
| 6,947,285 B2 | 9/2005 | Chen et al. | |
| 6,965,513 B2 | 11/2005 | Montgomery et al. | |
| 7,102,285 B2 | 9/2006 | Chen | |
| 7,148,512 B2* | 12/2006 | Leu et al. ........................ | 257/77 |
| 7,160,620 B2 | 1/2007 | Huang et al. | |
| 7,183,003 B2* | 2/2007 | Leu et al. ..................... | 428/408 |
| 7,253,442 B2* | 8/2007 | Huang et al. ................... | 257/77 |
| 2003/0117770 A1 | 6/2003 | Montogmery et al. | |
| 2004/0097635 A1 | 5/2004 | Fan et al. | |
| 2005/0136248 A1 | 6/2005 | Leu et al. | |
| 2005/0167647 A1 | 8/2005 | Huang et al. | |
| 2005/0174028 A1 | 8/2005 | Jung et al. | |
| 2005/0224220 A1 | 10/2005 | Li et al. | |
| 2005/0255304 A1 | 11/2005 | Brink | |
| 2006/0019079 A1* | 1/2006 | Rodriguez et al. ......... | 428/292.1 |
| 2006/0073332 A1 | 4/2006 | Huang et al. | |
| 2006/0118791 A1* | 6/2006 | Leu et al. ...................... | 257/77 |
| 2006/0135677 A1 | 6/2006 | Huang et al. | |

* cited by examiner

*Primary Examiner*—Michael J Feely
(74) *Attorney, Agent, or Firm*—Clifford O. Chi

(57) ABSTRACT

A CNT composite (10) includes a matrix (14) and a number of CNTs (12) embedded in the matrix. The matrix has a surface (102) and an opposite surface (104). Head portions of the respective CNTs are consistently oriented, parallel to the surfaces of the matrix. A method for manufacturing the composite includes (a) providing a substrate and depositing a catalyst film on the substrate; (b) forming the array of CNTs via the catalyst film on the substrate; (c) immersing the CNTs in a liquid matrix material, infusing the liquid matrix material into the array of CNTs; (d) taking the carbon nanotubes with the infused matrix out of the liquid matrix; (e) pressing the still-soft matrix and the CNTs therein, in order to arrange the CNTs consistently and parallel to the surfaces of the matrix; and (f) solidifying and peeling away the matrix to produce the CNT composite.

19 Claims, 11 Drawing Sheets

CARBON NANOTUBE COMPOSITE AND METHOD FOR FABRICATING THE SAME

BACKGROUND

1. Field of the Invention

The invention generally relates to carbon nanotube composites and, more particularly, to a carbon nanotube composite having matrix-parallel nanotube structures and a method for manufacturing the carbon nanotube composite.

2. Discussion of Related Art

Carbon nanotubes (also herein referred to as CNTs) were first observed and reported in an article by Iijima in 1991 (Nature, Vol. 354, Nov. 7, 1991, pp. 56-58). Typically, CNTs are very small tube-shaped structures and are essentially consist of graphite. CNTs have interesting and potentially useful properties, such as electrical and mechanical properties, and offer potential for various application fields.

In polymers, CNTs have substantial potential for enhancing the carbon nanotube (CNT) composite's strength, toughness, electrical conductivity and thermal conductivity. Referring to FIG. 11, U.S. Pat. No. 6,924,335, the contents of which are hereby incorporated by reference, discloses a kind of CNT composite 40. This CNT composite 40 has a number of CNTs 42 embedded in a polymer matrix 44. In the CNT composite 40, the CNTs 42 are parallel to one another and perpendicular to surfaces 46, 48 of the CNT composite 40. However, the CNTs 42 do not contact one another. The configuration limits a thickness of the CNT composite 40 to be equal to a length of the CNTs 12, i.e., a several hundreds microns, and limits a direction for thermal and/or electrical conduction. Furthermore, a range of thermal and/or electrical conduction is restricted to the length of the CNTs 12.

Therefore, a CNT composite with good thermal/electrical conductivity in a direction parallel to a surface of the CNT composite and perpendicular to a growing direction of the CNTs and, more particularly, a method for manufacturing such a composite are desired.

SUMMARY OF THE INVENTION

A CNT composite includes a matrix and a number of CNTs embedded in the matrix. The matrix has a main surface and an opposite surface. The CNTs are arranged in a consistent orientation, and at least one portion of the CNTs is parallel to the main surface of the matrix.

A method for manufacturing the CNT composite includes:

providing a number of carbon nanotubes distributed in a number of parallel strip-shaped areas of a substrate;

immersing the carbon nanotubes into a liquid matrix in order to introduce the liquid matrix into clearances among the carbon nanotubes;

taking the carbon nanotubes with the matrix bound thereto out of the liquid matrix;

pressing the carbon nanotubes down along a consistent direction;

solidifying the matrix bound to the carbon nanotubes; and peeling off the matrix bound with the carbon nanotubes from the substrate, thereby obtaining a CNT composite.

Other advantages and novel features of the CNT composite and the present method thereof will become more apparent from the following detailed description of preferred embodiments when taken in conjunction with the accompanying drawings.

BRIEF DESCRIPTION OF THE DRAWINGS

Many aspects of the present composite and method can be better understood with reference to the following drawings. The components in the drawings are not necessarily to scale, the emphasis instead being placed upon clearly illustrating the principles of the present composite and method.

Figure 1:
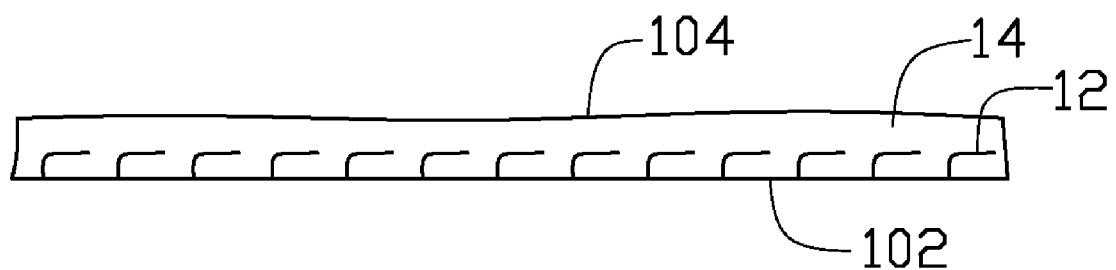
FIG. 1 is a schematic, cross-section view of a CNT composite, according to a preferred embodiment.

Corresponding reference characters indicate corresponding parts throughout the several views. The exemplifications set out herein illustrate at least one preferred embodiment of the present composite and method, in one form, and such exemplifications are not to be construed as limiting the scope of the invention in any manner.

DETAILED DESCRIPTION OF PREFERRED EMBODIMENTS

Figure 2:
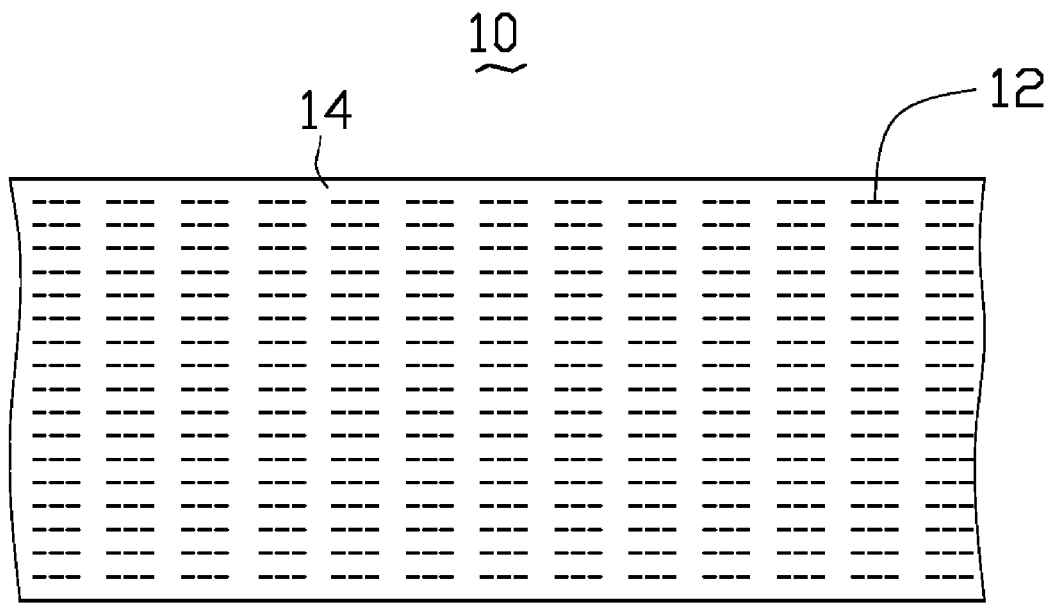
FIG. 2 is a schematic, top view of the CNT composite of FIG. 1.

Referring to FIGS. 1 and 2, a CNT composite 10, according to a preferred embodiment, is shown. The CNT composite 10 includes a matrix 14 and a number of CNTs 12 uniformly embedded in the matrix 14. The matrix 14 is in a thin-film form. The matrix 14 has a length, a width and a thickness. The matrix has a first planar surface 102 and a second planar surface 104 opposite to the first planar surface 102. The first planar surface 102 and the second planar surface 104 are both defined by the width and the length of the matrix 14. Head/upper portions of the CNTs 12 are aligned substantially parallel to the second planar surface 104, and growth end portions of the CNTs 12 are substantially perpendicular and attached to the first planar surface 102. Furthermore, the CNTs 12 are distributed in a number of parallel rows aligned along a length direction of the CNT composite 10 and in a number of columns aligned along a width direction of the CNT composite 10. The CNTs 12 in the same row but in two adjacent columns approach but do not contact one another. The matrix 14 may, usefully, be a macromolecular material such as epoxy resin, acrylic acid resin, silicone, and thermal conductive grease, or a mixture thereof. A length of the CNTs 12 can be selected according to application need and/or other fabricating conditions. The length of the CNTs 12 is, advantageously, in a range of about 100-200 microns, in order to maximize their potential thermal/electrical conductivity.

Figure 3:
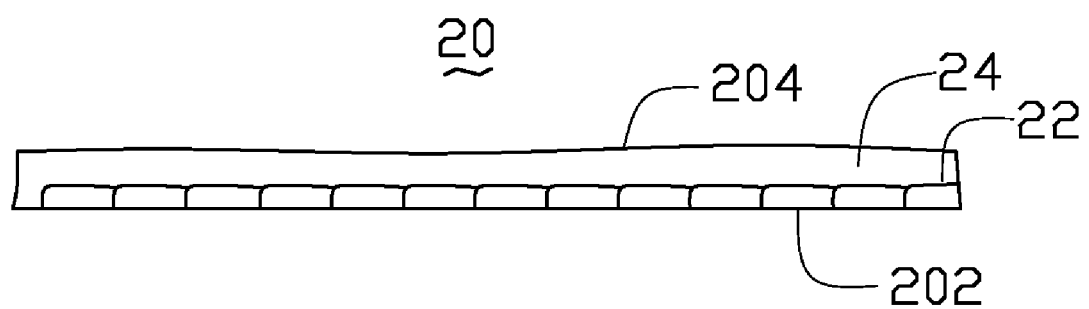
FIG. 3 is a schematic, cross-section view of the CNT composite, according to another preferred embodiment.
Figure 4:
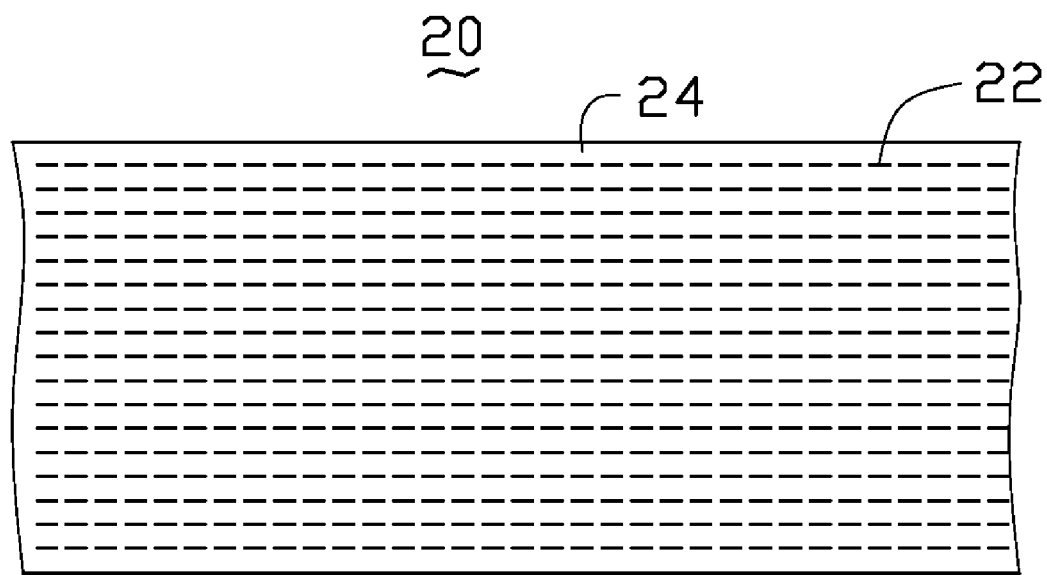
FIG. 4 is a schematic, top view of the CNT composite of FIG. 3.

Referring to FIGS. 3 and 4, a CNT composite 20, according to the second preferred embodiment, is shown. The CNT composite 20 includes a matrix 24 and a number of CNTs 22 uniformly embedded in the matrix 24. The matrix 24 is, most suitably, in a thin-film form. The matrix 24 has a length, a width and a thickness. The matrix has a first planar surface 202 and a second planar surface 204 opposite to the first planar surface 202. The first planar surface 202 and the second planar surface 204 are both defined by the width and the length of the matrix 24. The CNT composite 20 is similar to the CNT composite 10, except that each of the CNTs 22 contacts other CNTs 22 in the same row and two adjacent columns. Each of the CNTs 22 can provide a thermal and/or electrical conduction path. The contacting CNTs 22 can provide a number of paths for thermal and/or electrical conduction, and the paths are parallel to the two opposite planar surfaces 202, 204. Because of these paths, the CNT composite 20 has a good thermal and/or electrical conductivity in a direction parallel to the first and second planar surfaces 202, 204 thereof.

Referring to FIGS. 3 and 4, a CNT composite 20, according to the second preferred embodiment, is shown. The CNT composite 20 includes a matrix 24 and a number of CNTs 22 uniformly embedded in the matrix 24. The matrix 24 is, most suitably, in a thin-film form. The matrix has a first surface 202 and a second surface 204 opposite to the first surface 202. The CNT composite 20 is similar to the CNT composite 10, except that each of the CNTs 22 contacts other CNTs 22 in the same row and two adjacent columns. Each of the CNTs 22 can provide a thermal and/or electrical conduction path. The contacting CNTs 22 can provide a number of paths for thermal and/or electrical conduction, and the paths are parallel to the two opposite surfaces 202, 204. Because of these paths, the CNT composite 20 has a good thermal and/or electrical conductivity in a direction parallel to the surfaces 202, 204 thereof.

Referring to FIGS. 5 through 9, a method for manufacturing the CNT composite 10 is described in detail, as follows.

Figure 5:
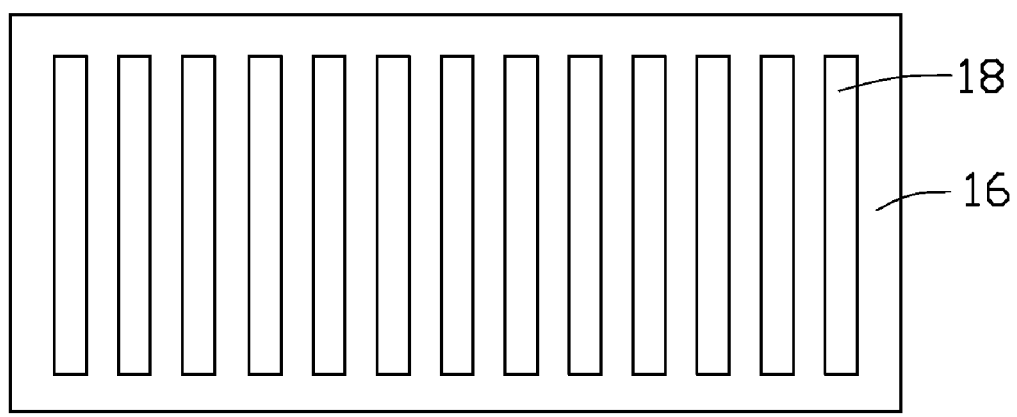
FIG. 5 is a top view of a substrate with strip-shaped catalyst films deposited thereon, according to a preferred embodiment.

In step 1, as shown in FIG. 5, a substrate 16 is provided and a number of catalyst strips 18 are deposited thereon. The substrate 16 can be made of, for example, glass, quartz, silicon, alumina, etc. The catalyst film 18 can be made, e.g., of iron (Fe), cobalt (Co), nickel (Ni), or an alloy thereof. In this preferred embodiment, a silicon wafer is selected as the substrate 16, an iron film of about 5 nanometers (nm) thick functioning as the catalyst film is deposited on an entire surface of the silicon wafer (i.e., substrate 16) by, for example, thermal deposition, electron-beam deposition, or sputtering deposition. The catalyst film is then divided into a number of separated strips by photolithography or masking, and, as such, the catalyst strips 18 are formed on the substrate 16.

The catalyst strips 18 are in a number of parallel rows along a length direction of the substrate 16 and in a number of columns along a width direction of the substrate 16. The widths and lengths of each the catalyst strips 18 are, usefully, substantially equal. The distances separating adjacent catalyst strips 18 are selected according to an application need. In the preferred embodiment, the distances separating adjacent catalyst strips 18 are a little longer than a predetermined length of the CNTs grown in a subsequent step.

The distribution density of the CNTs together with the width of the catalyst strips 18 determines the quantity of the CNTs. To obtain a sufficient quantity of CNTs, the width of each of the catalyst strips 18 is determined by the distribution density of the CNTs. The greater the distribution density of the CNTs, the less the width of the catalyst films 18, vice verse. Accordingly, the widths of the catalyst films 18 are, advantageously, in a range from ten to several tens of microns ($\mu m$), approximately.

Figure 6:
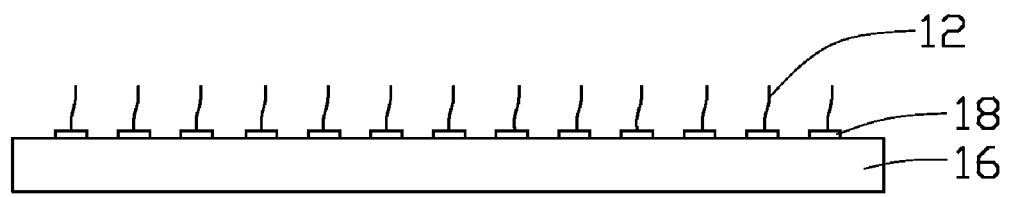
FIG. 6 is a schematic, cross-section view showing a number of aligned CNTs deposited on the substrate of FIG. 5.

In step 2, as shown in FIG. 6, an array of CNTs 12 is grown from the catalyst strips 18 on the substrate 16 by a chemical vapor deposition (CVD) process. Preferably, before the CVD process, the substrate 16 with the catalyst strips 18 deposited thereon is annealed in ambient air at 300-400° C. for approximate 10 hours, in order to transform the catalyst into nano-sized catalyst oxide particles. The catalyst oxide particles are then reduced to form the pure catalyst particles, by introducing a reducing agent such as ammonia or hydrogen. The annealing step is beneficial for transforming the catalyst of the catalyst strips 18 into uniform nano-sized catalyst particles, which will affect the uniformity of the CNTs grown in a subsequent step, since the CNTs directly grow from the catalyst particles. After that, the substrate 16 with the catalyst strips 18 deposited thereon is placed into a CVD reaction chamber, a carbon source gas is introduced into the chamber, and then the CNTs are formed on the substrate. The carbon source gas is, e.g., ethylene ($C_2H_4$), methane ($CH_4$), acetylene ($C_2H_2$), ethane ($C_2H_6$), or another suitable hydrocarbon. In the preferred embodiment, the chamber is heated up to 700° C., an ethylene gas as a carbon source gas is introduced thereinto, and then the CNTs 12 are grown upon the catalyst strips 18 on the substrate 16.

The length of the CNTs 12 determines the spacings between adjacent catalyst strips 18. In other words, the longer the CNTs 12, the wider the distances separating adjacent catalyst strips 18. This configuration ensures that the distances between CNTs 12 in the same rows and adjacent columns are a little longer than the length of the CNTs 12. According to the length of CNTs 12 in the preferred embodiment, the spacing between adjacent catalyst strips 18 is 100-200 $\mu m$, which is a little larger than the length of the CNTs 12.

Figure 7:
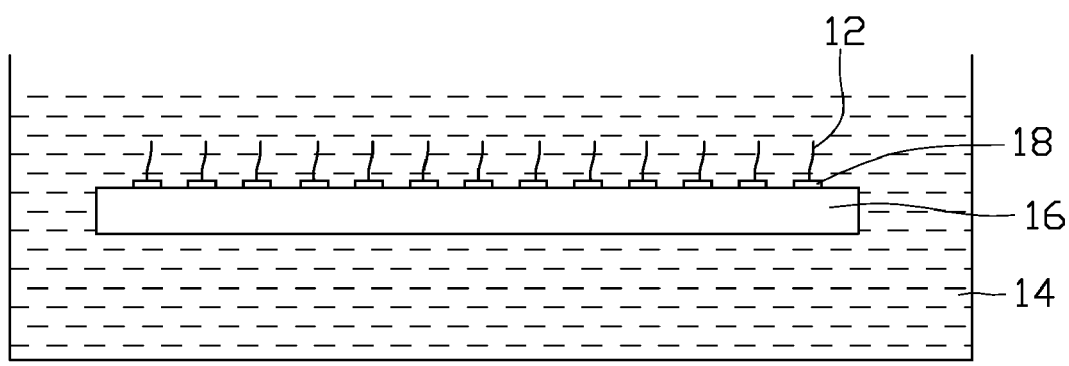
FIG. 7 is similar to FIG. 6, but showing the substrate with the CNTs deposited thereon immersed in a liquid matrix material.

In step 3, referring to FIG. 7, the CNTs 12 with the substrate 16 are immersed into a liquid matrix 14', such as molten or solution of the matrix 14, and then the CNTs 12 are surrounded with the matrix 14. The matrix 14 is, advantageously, a resin, such as epoxy resin, acrylic resin, and silicone, thermal conductive grease, or a mixture thereof. In the preferred embodiment, a silicone and the steps include the following: a silicone, functioning as the matrix 14, is dissolved into another liquid, e.g., ether, then a silicone solution is obtained. A small amount of a curing agent is added into the silicone solution to adjust a time for solidifying the solution in more than two hours. The CNTs are immersed into the silicone solution, surrounding the CNTs with the silicone. The CNTs are now physically combined with silicone, and then are taken out of the silicone solution, with the curing agent beginning to set the silicone matrix. The curing agent could be, e.g., an epoxy resin curing agent, alkaline type curing agent, and/or acid type curing agent. The alkaline type curing agent is a material, for example, selected from a group consisting of aliphatic diamine, aromatic polyamines, modified aliphatic amine, and other nitrogen compounds, and the acid type curing agent is a material, for example, selected from a group consisting of organic acid, anhydride, boron trifluoride complex, and other complex compound.

Figure 8:
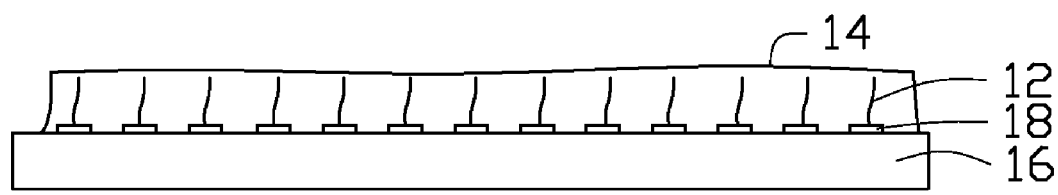
FIG. 8 is similar to FIG. 7, but showing the substrate with the CNTs deposited thereon embedded in a semi-solidified matrix material.
Figure 9:
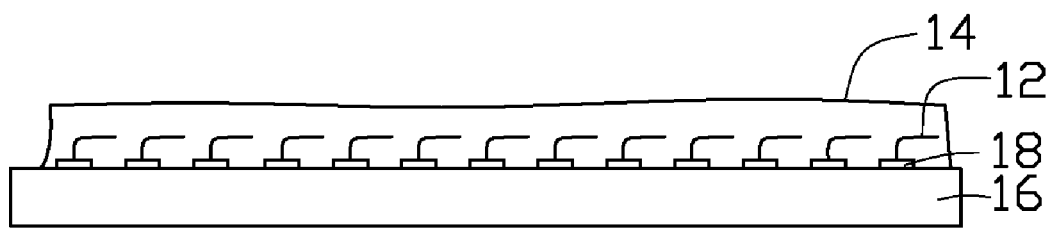
FIG. 9 is similar to FIG. 8, but showing the substrate with the CNTs deposited thereon embedded in a solidified matrix material after the CNTs are pressed down.

In step 4, as shown in FIGS. 8 and 9, the CNTs 12 are pressed down when the matrix 14 is still soft and reflexible. Specifically, the CNTs 12 can be pressed down by a pressing means, such as a cylindrical tool or a polished plate. After the CNTs 12 are pressed down, the head/upper portions of the bent CNTs 12 are in a consistent direction perpendicular to the CNT 12 growing direction and parallel to the surface of the matrix 14, and the attached/base end portions of the bent CNTs 12 are perpendicular or substantially so to the substrate 36. The key actually is that the bent head portions of the CNTs 12 are essentially made parallel to the surface of the matrix 14 even while the base end portions thereof remain attached. It is not so much, in many instances, whether the base ends remain perpendicular to the substrate 36. Then, the matrix 14 is cooled and solidified (i.e., curing is completed). The total time in step 3 and 4 should be controlled in a certain range to avoid being unable to press the CNTs down. The total time is determined by a curing rate of the matrix 14, which, preferably, is about 15 minutes.

In step 5, the solidified matrix 14 with the bent CNTs 12 embedded therein is peeled away from the substrate 16, and then the CNT composite 10 is obtained. The CNT composite 10 includes the matrix 14 and a number of CNTs 12 uniformly embedded in the matrix 14. The CNTs 12 are distributed in a number of parallel rows aligned along a length direction of the CNT composite 10 and in a number of columns aligned along a width direction of the CNT composite 10. The CNTs 12 that are in the same row but in two adjacent columns approach but do not contact one another, in this particular embodiment.

It is noted that the method for fabricating the CNT composite can further include, after the peeling off step, a step of removing the remainder catalyst from the surface of the composite with a conventional approach such as cutting, grinding, etc. Depending on the application, the substrate may, however, be retained as part of the composite structure.

In a second embodiment, a method for manufacturing the CNT composite 20 is similar to that of the first preferred embodiment; expect that the distance separating adjacent catalyst strips are equal to or smaller than the length of the CNTs 22 in step 2, in order to ensure that the CNTs 22 in the same row and in adjacent columns can contact one another after being pressed down.

The CNT composite can be applied in numerous fields. For example, according to whether or not the CNTs in the same row and in adjacent columns contact one another, they can be used as a thermal conductive material, electrical conductive material, smart switch, etc.

Referring to FIG. 3, in the second preferred embodiment, the length of CNTs 22 is larger than or equal to the spacing between adjacent CNTs columns. After being pressed down, the CNTs 22 in the same row and in adjacent columns can contact one another. Each of the contacting CNTs 22 can provide a thermal and/or electrical conduction path. The bent and contacted CNTs 22 embedded in the matrix 24 provide a number of thermal and/or electrical conduction paths parallel to the surface of the CNT composite 20. Accordingly, the CNT composite 20 can function as a electrically/thermally conductive material with thermal/electrical conduction direction parallel to the surface thereof.

Figure 10:
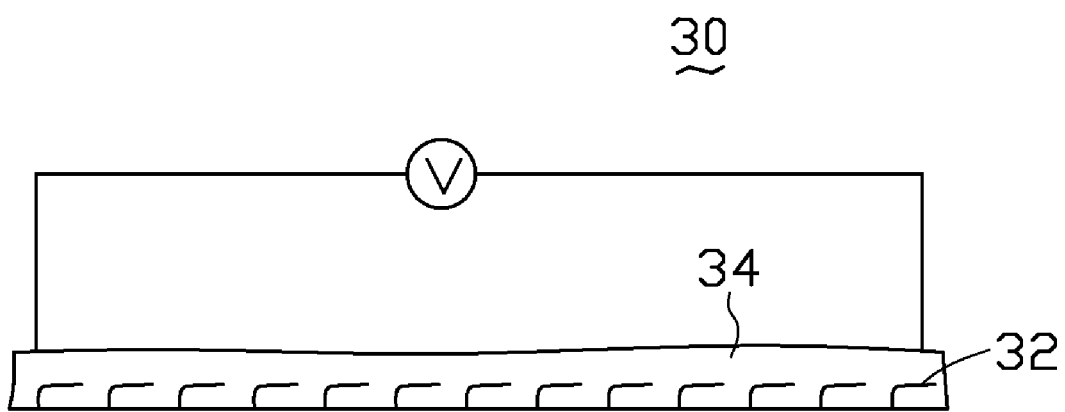
FIG. 10 is similar to FIG. 1, but showing the CNT composite utilized as a smart switch.
Figure 11:
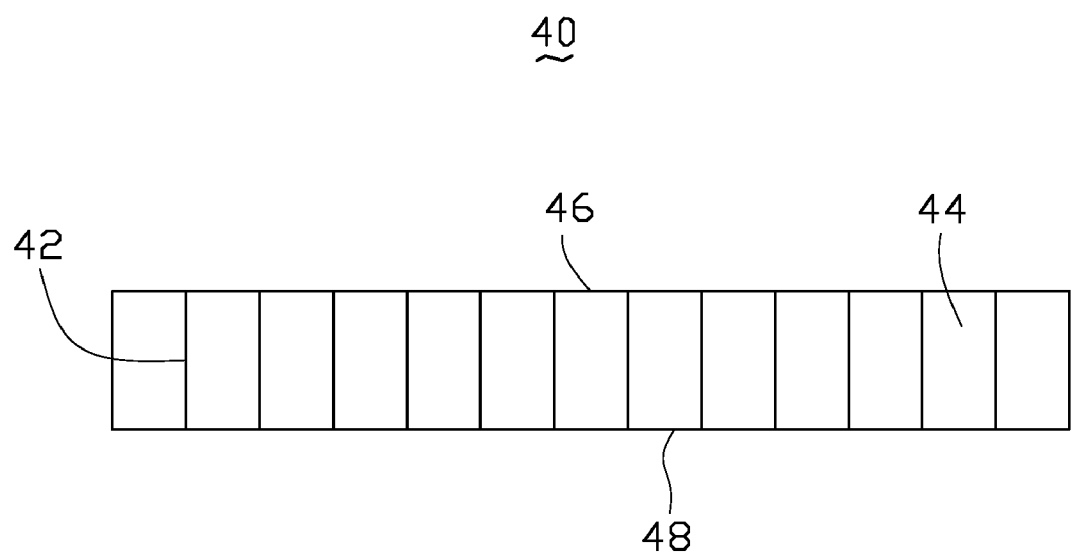
FIG. 11 is a schematic, cross-section view of a conventional CNT composite, according to the prior art.

Referring to FIG. 10, the CNT composite 30 functions as a smart switch. The CNT composite 30 includes a matrix 34 and a number of CNTs 32. The length of CNTs 32 is a little smaller than the spacing between the CNTs 32 in the same row and in adjacent columns. After being pressed down, the bent CNTs 32 in the same row and in adjacent columns cannot contact one another and are isolated with a layer/amount of matrix 34. A voltage can be applied perpendicular to the CNTs 32 growing direction and parallel to the surface of matrix 34. When the voltage is low, there is not a current passing through the CNT composite 30; and when the voltage is high enough, an electronic tunnel (i.e., essentially, arcing) occurs in the layer of matrix 34 between the CNTs in the same row and in adjacent columns. In such a high voltage state, the CNT composite 30 is electrically conductive parallel to the surface thereof. Because of these behavior differences based on applied voltage, the CNT composite 30 can, usefully, be applied as a smart switch by the control of the voltage applied thereto.

Finally, it is to be understood that the embodiments mentioned above are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A carbon nanotube composite comprising:
    a matrix defined by a length, a width and a thickness, and having a first planar surface and a second planar surface opposite to the first planar surface, the first planar surface and the second planar surface being defined by the width and the length of the matrix; and
    a plurality of carbon nanotubes embedded in the matrix, at least one portion of the carbon nanotubes being aligned in a consistent orientation, the at least one portion of the carbon nanotubes further being parallel to at least the first planar surface;
    wherein the carbon nanotubes are distributed in a plurality of parallel rows along a length direction of the carbon nanotube composite and in a plurality of columns along a width direction of the carbon nanotube composite, each of the carbon nanotubes contacts another carbon nanotube distributed in the same row and in two adjacent columns.

2. The carbon nanotube composite as claimed in claim 1, wherein the matrix is comprised of a material selected from a group consisting of a resin, thermal conductive grease, and a mixture thereof.

3. The carbon nanotube composite as claimed in claim 2, wherein the resin is an epoxy resin, an acrylic resin, or a silicone.

4. The carbon nanotube composite as claimed in claim 1, wherein a length of each carbon nanotube is approximately in a range from 100 microns to 200 microns.

5. A carbon nanotube composite comprising:
    a matrix defined by a length, a width and a thickness, and having a first planar surface and a second planar surface opposite to the first planar surface, the first planar surface and the second planar surface being defined by the width and the length of the matrix; and
    a plurality of carbon nanotubes embedded in the matrix, at least one portion of the carbon nanotubes being aligned in a consistent orientation, the at least one portion of the carbon nanotubes further being parallel to at least the first planar surface;
    wherein the carbon nanotubes are distributed in a plurality of parallel rows along a length direction of the carbon nanotube composite and in a plurality of columns along a width direction of the carbon nanotube composite, each of the carbon nanotubes approaches but does not contact another carbon nanotube distributed in the same row and in two adjacent columns.

6. The carbon nanotube composite as claimed in claim 5, wherein the matrix is in a thin film form.

7. The carbon nanotube composite as claimed in claim 5, wherein the carbon nanotubes are totally embedded in the matrix.

8. A method for manufacturing a carbon nanotube composite, the method comprising the steps of:

(a) providing a plurality of carbon nanotubes distributed in a plurality of parallel strip-shaped areas on a substrate;
(b) immersing the carbon nanotubes into a liquid matrix, thereby introducing the liquid matrix into clearances among the carbon nanotubes;
(c) taking the carbon nanotubes surrounded with the matrix out of the liquid matrix;
(d) pressing the carbon nanotubes down along a consistent direction; and
(e) solidifying the matrix surrounding the carbon nanotubes, wherein the matrix after solidified has a length, a width, a thickness, a first planar surface and a second planar surface opposite to the first planar surface, the first planar surface and the second planar surface are defined by the width and the length of the matrix.

9. The method as claimed in claim 8, wherein in step (a), the carbon nanotubes are grown on a plurality of strip-shaped catalyst strips by a chemical vapor deposition method, the catalyst strips being spaced with equal distance.

10. The method as claimed in claim 9, where the catalyst strips are aligned into a plurality of parallel columns.

11. The method as claimed in claim 9, wherein a width of the catalyst strips is about in a range from ten to several tens of microns.

12. The method as claimed in claim 9, wherein the distance separating the adjacent catalyst strips is larger than a predetermined length of the carbon nanotubes.

13. The method as claimed in claim 9, wherein the distance separating the adjacent catalyst strips is shorter than or equal to a predetermined length of the carbon nanotubes.

14. The method as claimed in claim 8, wherein in the step (d), the carbon nanotubes are pressed down by a cylindrical tool or a polished plate.

15. The method as claimed in claim 8, wherein a length of the carbon nanotubes is in an approximate range from 100 microns to 200 microns.

16. The method as claimed in claim 8, wherein in step (e), a time for solidifying the matrix is approximately 15 minutes.

17. The method as claimed in claim 8, wherein the method further comprises a step of peeling off the matrix, with the carbon nanotubes bound therein, from the substrate, after step (e).

18. The method as claimed in claim 17, wherein, in step (a), the carbon nanotubes are grown on a plurality of strip-shaped catalyst strips, the method further comprising a step, after the peeling off step, of cutting or grinding to remove the remainder of the catalyst strips from the carbon nanotube composite.

19. The method as claimed in claim 8, wherein at least one portion of the carbon nanotubes is aligned in a consistent orientation and parallel to at least the first planar surface.

* * * * *

UNITED STATES PATENT AND TRADEMARK OFFICE
CERTIFICATE OF CORRECTION

| | |
|---|---|
| PATENT NO. | : 7,662,467 B2 |
| APPLICATION NO. | : 11/550369 |
| DATED | : February 16, 2010 |
| INVENTOR(S) | : Li et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this

Thirtieth Day of November, 2010

David J. Kappos
*Director of the United States Patent and Trademark Office*